US008199611B2

(12) United States Patent
Goujon

(10) Patent No.: US 8,199,611 B2
(45) Date of Patent: Jun. 12, 2012

(54) DERIVING TILT-CORRECTED SEISMIC DATA IN A MULTI-AXIS SEISMIC SENSOR MODULE

(75) Inventor: Nicolas Goujon, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 479 days.

(21) Appl. No.: 12/366,297

(22) Filed: Feb. 5, 2009

(65) Prior Publication Data

US 2010/0195438 A1   Aug. 5, 2010

(51) Int. Cl.
*G01V 1/18* (2006.01)
*G01V 1/00* (2006.01)
*B06B 1/06* (2006.01)
*G01F 25/00* (2006.01)
*G01D 18/00* (2006.01)

(52) U.S. Cl. ............... 367/178; 367/14; 367/37; 367/38; 367/43; 367/140; 73/1.27; 702/85; 702/86; 702/92; 702/103

(58) Field of Classification Search ............... 367/43, 367/178, 14, 37, 38, 140; 73/1.27; 702/85, 702/86, 92, 93, 103, 104
See application file for complete search history.

(56) References Cited

U.S. PATENT DOCUMENTS

| | | | | |
|---|---|---|---|---|
| 4,050,540 A | * | 9/1977 | Cholet et al. | 181/114 |
| 4,458,341 A | * | 7/1984 | Goebel | 367/43 |
| 4,893,290 A | * | 1/1990 | McNeel et al. | 367/178 |
| 5,126,980 A | * | 6/1992 | Sallas et al. | 367/178 |
| 5,128,898 A | * | 7/1992 | Hill et al. | 367/13 |
| 5,268,878 A | * | 12/1993 | Scheiber | 367/140 |
| 5,572,483 A | * | 11/1996 | Chambers et al. | 367/45 |
| 6,006,832 A | * | 12/1999 | Tubel et al. | 166/250.01 |
| 6,076,045 A | * | 6/2000 | Naville | 702/10 |
| 6,130,534 A | * | 10/2000 | Huang et al. | 324/202 |
| 6,353,577 B1 | | 3/2002 | Orban et al. | |
| 6,412,592 B1 | | 7/2002 | Meynier | |
| 6,751,162 B2 | | 6/2004 | Dominguez et al. | |
| 6,961,283 B2 | | 11/2005 | Kappius et al. | |
| 7,117,111 B2 | * | 10/2006 | Jian | 702/93 |
| 7,162,807 B2 | * | 1/2007 | Choi et al. | 33/356 |
| 7,260,024 B2 | * | 8/2007 | Goujon et al. | 367/188 |
| 7,292,504 B2 | | 11/2007 | Luc | |
| 2001/0020900 A1 | * | 9/2001 | Froeschl et al. | 340/671 |
| 2002/0126574 A1 | * | 9/2002 | Downey et al. | 367/14 |
| 2003/0198132 A1 | * | 10/2003 | Kappius et al. | 367/43 |
| 2004/0017730 A1 | * | 1/2004 | Jackson et al. | 367/25 |
| 2005/0036403 A1 | * | 2/2005 | Leggett et al. | 367/32 |
| 2006/0034150 A1 | * | 2/2006 | Scott | 367/15 |
| 2006/0100820 A1 | * | 5/2006 | Davidson | 702/151 |

(Continued)

OTHER PUBLICATIONS

Laine, J.; Mougenot, D.; , "Benefits of MEMS Based Seismic Accelerometers for Oil Exploration," International Solid-State Sensors, Actuators and Microsystems Conference, 2007. Transducers 2007. pp. 1473-1477, Jun. 10-14, 2007.*

(Continued)

*Primary Examiner* — Thomas Tarcza
*Assistant Examiner* — James Hulka

(57) ABSTRACT

A seismic sensor module includes sensing elements arranged in a plurality of axes to detect seismic signals in a plurality of respective directions, and a processor to receive data from the sensing elements and to determine inclinations of the axes with respect to a particular orientation. The determined inclinations are used to combine the data received from the sensing elements to derive tilt-corrected seismic data for the particular orientation.

20 Claims, 4 Drawing Sheets

U.S. PATENT DOCUMENTS

2006/0117874 A1* 6/2006 Goujon et al. ............... 73/866.1
2006/0142946 A1* 6/2006 Goujon et al. ................ 702/18
2006/0171253 A1* 8/2006 Goujon et al. ................ 367/15
2006/0241883 A1* 10/2006 Kwon et al. .................. 702/92
2006/0245300 A1* 11/2006 De Kok et al. ............... 367/15
2007/0055468 A1* 3/2007 Pylvanainen ................. 702/92

OTHER PUBLICATIONS

Emore, Gordon L.; Haase, Jennifer S.; Kyuhong Choi; Larson, Kristine M.; Yamagiwa, Atsushi. "Recovering Seismic Displacements through Combined Use of 1-Hz GPS and Strong-Motion Accelerometers" Bulletin of the Seismological Society of America (0037-1106) Apr. 1, 2007. vol. 97,Iss.2;p. 357-378.*

Graizer, Vladimir M., ."Effect of tilt on strong motion data processing" Soil Dynamics & Earthquake Engineering (0267-7261) Apr. 1, 2005. vol. 25,Iss.3;p. 197-204.*

Geophone, Wikipedia, http://en.wikipedia.org/wiki.Geophone, Jun. 4, 2008.

PCT Search Report, dated Oct. 4, 2010, Application No. PCT/US2010/023084.

* cited by examiner

DERIVING TILT-CORRECTED SEISMIC DATA IN A MULTI-AXIS SEISMIC SENSOR MODULE

TECHNICAL FIELD

The invention relates generally to deriving tilt-corrected seismic data in a seismic sensor module having a plurality of sensing elements arranged in multiple axes.

BACKGROUND

Seismic surveying is used for identifying subterranean elements, such as hydrocarbon reservoirs, fresh water aquifers, gas injection reservoirs, and so forth. In performing seismic surveying, seismic sources are placed at various locations above an earth surface or sea floor, with the seismic sources activated to generate seismic waves directed into the subterranean structure. Examples of seismic sources include explosives, air guns, or other sources that generate seismic waves. In a marine seismic surveying operation, the seismic sources can be towed through water.

The seismic waves generated by a seismic source travel into the subterranean structure, with a portion of the seismic waves reflected back to the surface for receipt by seismic sensors (e.g., geophones, hydrophones, etc.). These seismic sensors produce signals that represent detected seismic waves. Signals from seismic sensors are processed to yield information about the content and characteristic of the subterranean structure.

For land-based seismic data acquisition, seismic sensors are implanted into the earth. Typically, seismic signals traveling in the vertical direction are of interest in characterizing elements of a subterranean structure. Since a land-based seismic data acquisition arrangement typically includes a relatively large number of seismic sensors, it is usually impractical to attempt to implant seismic sensors in a perfectly vertical orientation.

If a seismic sensor, such as a geophone, is tilted from the vertical orientation, then a vertical seismic signal (also referred to as a "compression wave" or "P wave") would be recorded with attenuated amplitude. Moreover, seismic signals in horizontal orientations (also referred to as "shear waves" or "S waves") will leak into the compression wave, where the leakage of the seismic signals into the compression wave is considered noise. Since the tilts of the seismic sensors in the land-based seismic data acquisition arrangement are unknown and can differ randomly, the noise will be incoherent from seismic sensor to seismic sensor, which makes it difficult to correct for the noise by performing filtering.

SUMMARY

In general, according to an embodiment, a seismic sensor module includes sensing elements arranged in a plurality of axes to detect seismic signals in a plurality of respective directions. The seismic sensor module also includes a processor to receive data from the sensing elements and to determine inclinations of the axes with respect to a particular orientation. The processor is to further use the determined inclinations to combine the data received from the sensing elements to derive tilt-corrected seismic data for the particular orientation.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
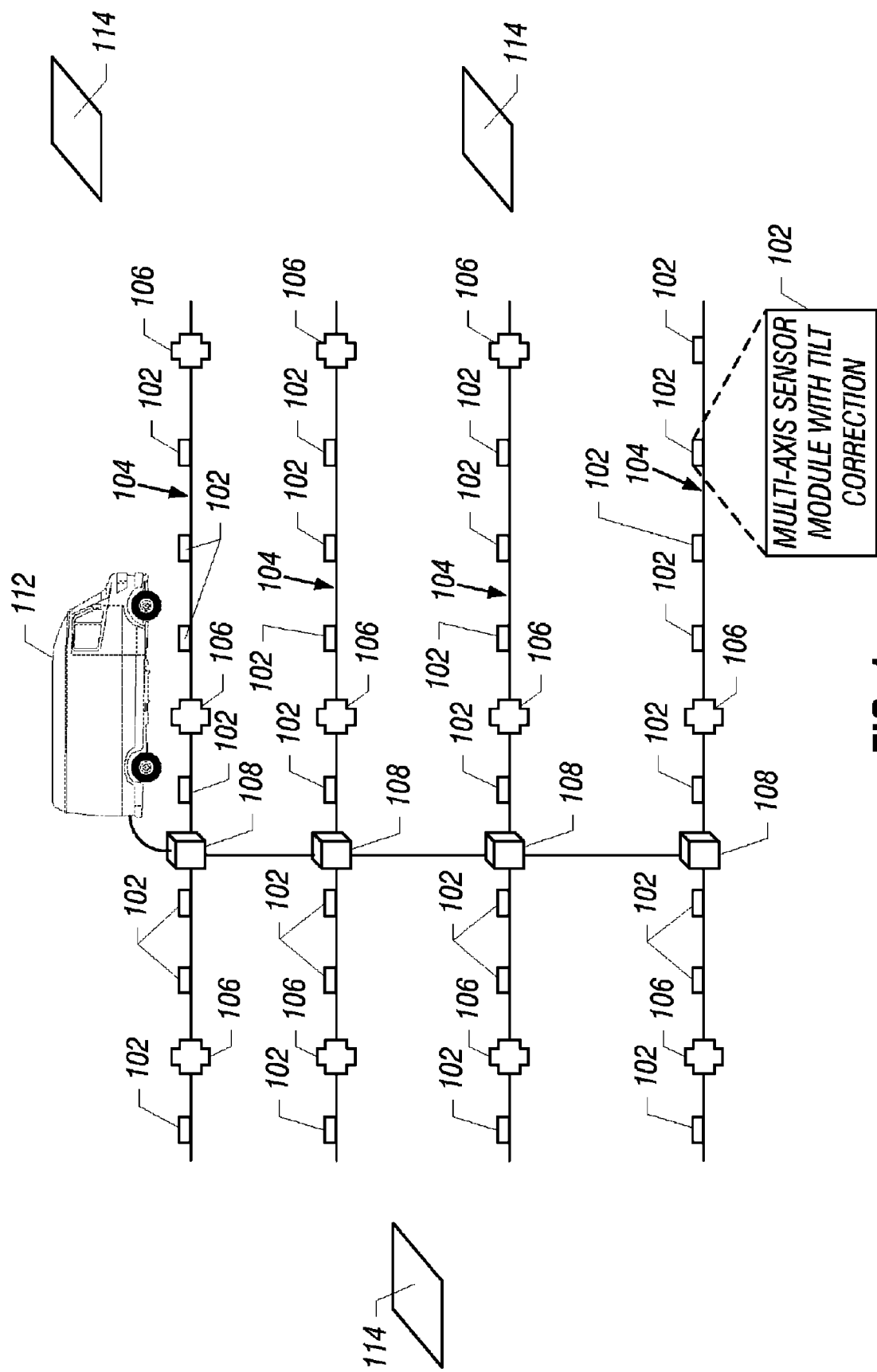
FIG. 1 illustrates an exemplary survey arrangement that includes seismic sensor modules according to some embodiments.

FIG. 1 illustrates an example survey arrangement (spread) that includes an array of seismic sensor modules 102. In accordance with some embodiments, the seismic sensor modules are multi-axis seismic sensor modules that each includes a processor to perform tilt correction to obtain seismic data along a vertical orientation (vertical direction) and to remove or reduce noise due to leakage of seismic signals propagating along horizontal orientations into the vertical seismic signal. More generally, the processor is able to obtain seismic data along a target orientation (which can be a vertical orientation, horizontal orientation, or any other orientation), and the processor is able to remove or reduce noise due to leakage of seismic signals propagating along other orientations into the seismic signal propagating in the target orientation.

The seismic sensor modules 102 are connected by communications links 104 (which can be in the form of electrical cables, for example) to respective routers 106 and 108 (also referred to as "concentrators"). A "concentrator" refers to a communications module that routes data between nodes of a survey data acquisition system.

Alternatively, instead of performing wired communications over electrical cables, the seismic sensor modules 102 can perform wireless communications with respective concentrators.

The concentrators 108 are connected by communications links 110. Seismic data acquired by the seismic sensor modules 102 are communicated through the concentrators 106, 108 to a central recording station 112 (e.g., a recording truck). The recording station 112 includes a storage subsystem to store the received seismic data from the seismic sensor modules 102. The recording station 112 is also responsible for management of the seismic sensor modules and concentrators, as well as the overall network.

One or more seismic sources 114 are provided, where the seismic sources 114 can be activated to propagate seismic signals into a subterranean structure underneath the earth on which the arrangement of seismic sensor modules 102 are deployed. Seismic waves are reflected from the subterranean structure, with the reflected seismic waves received by the survey sensor modules in the survey spread.

Figure 2:
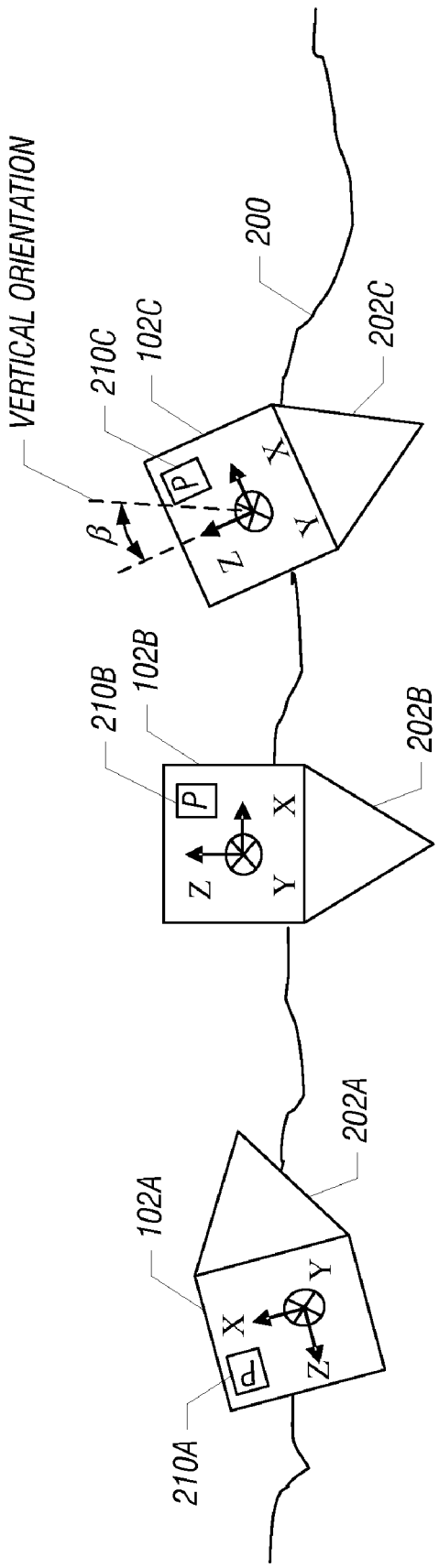
FIGS. 2-3 illustrate an exemplary deployment of seismic sensor modules.

FIG. 2 illustrates three seismic sensor modules 102A, 102B, 102C that have been implanted into the earth 200. Each seismic sensor module 102A, 102B, or 102C includes a respective implantation member (e.g., anchor) 202A, 202B, or 202C that has a tip to allow for ease of implantation. The seismic sensor module 102B has been implanted into the earth 200 to have a substantially vertical orientation (vertical direction) such that the seismic sensor module 102B is not tilted with respect to the vertical orientation (Z axis of the sensor module 102B is parallel to the vertical orientation). Also shown are X and Y axes, which are the horizontal axes that are orthogonal to each other and orthogonal to the Z axis.

The seismic sensor module 102C has been implanted to have a slight tilt such that the Z axis is at an angle β with respect to the vertical orientation. The seismic sensor module 102A has a much larger tilt with respect to the vertical orientation; in fact, the seismic sensor module 102A has been improperly implanted to lay on its side such that its Z axis is greater than 900 offset with respect to the vertical orientation.

Figure 3:
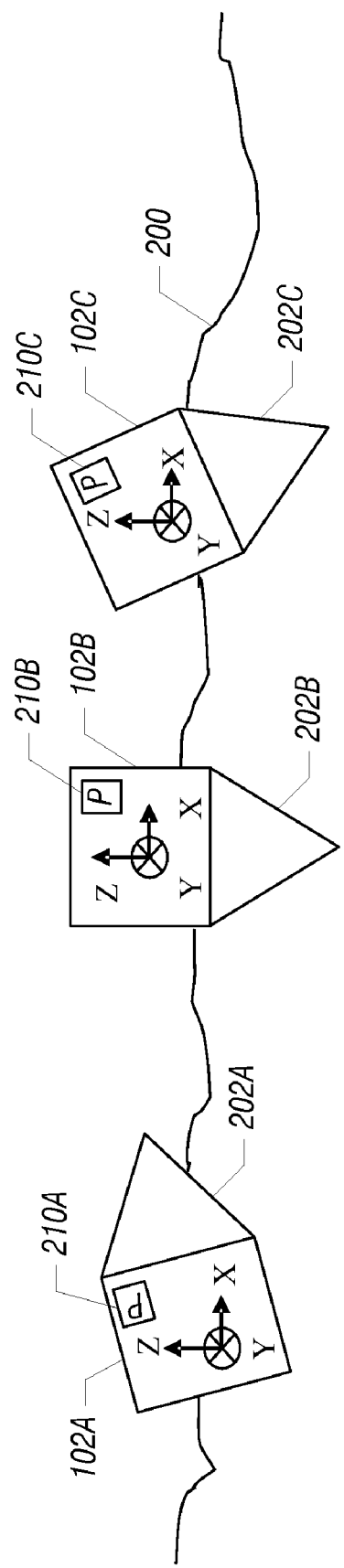

As further depicted in FIG. 2, each of the seismic sensor modules 102A, 102B, and 102C includes a respective processor 210A, 210B, and 210C. Each processor 210A, 210B, or 210C is able to perform tilt correction according to some embodiments to correct for tilt of the respective seismic sensor module from the vertical orientation. After tilt correction, the Z, X and Y axes are properly oriented, as shown in FIG. 3. More specifically, in FIG. 3, the Z axis of each of the seismic sensor modules 210A, 210B, and 210C is generally parallel to the vertical orientation. As a result, the seismic data along the Z axis is tilt-corrected with respect to the vertical orientation.

Figure 4:
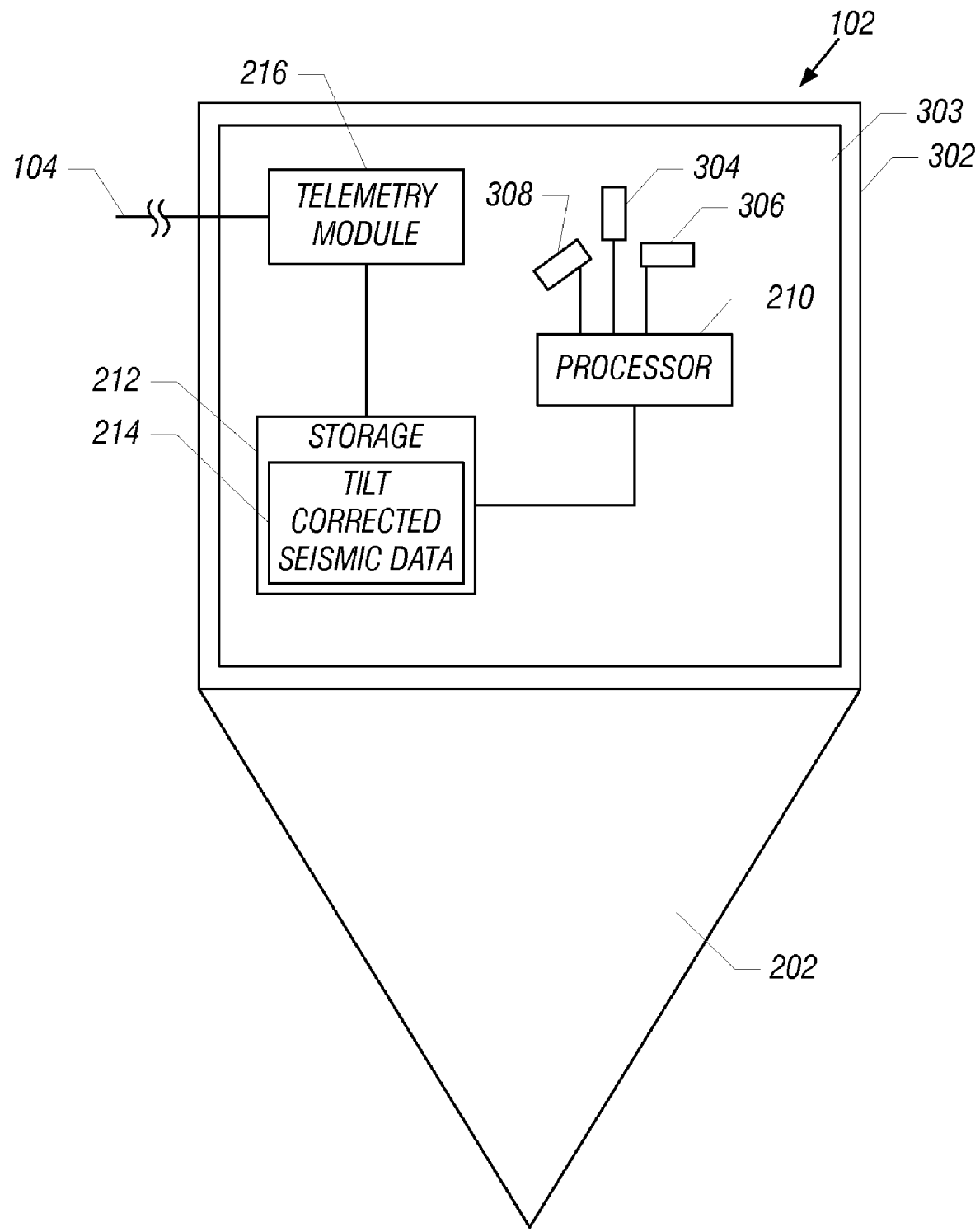
FIG. 4 is a schematic diagram of a seismic sensor module according to an embodiment.

FIG. 4 illustrates a seismic sensor module 102 according to an embodiment. The seismic sensor module 102 has a housing 302 defining an inner chamber 303 in which various components can be provided. The components include seismic sensing elements 304, 306, and 308 along the Z, X, and Y axes, respectively. In one embodiment, the seismic sensing elements 304, 306, and 308 can be accelerometers.

The seismic sensing elements 304, 306, and 308 are electrically connected to a processor 210 in the seismic sensor module 102. The "processor" can refer to a single processing component or to multiple processing components to perform predefined processing tasks. The processing component(s) can include application-specific integrated circuit (ASIC) component(s) or digital signal processor(s), as examples. The processing component(s) can be programmed by firmware or software to perform such tasks. The "processor" can also include filtering circuitry, analog-to-digital converting circuitry, and so forth (which can be part of or external to the processing circuitry).

The processor 210 is connected to a storage device 212, in which tilt-corrected seismic data 214 computed by the processor 210 can be stored. The seismic sensor module 102 also includes a telemetry module 216, which is able to send tilt-corrected seismic data over the communications link 104 (which can be a wired or wireless link). In accordance with some embodiments, instead of sending tilt-corrected seismic data in all three axes, just the tilt-corrected seismic data along a single axis (e.g., Z axis) is sent. As a result, communications link bandwidth is conserved, since the amount of seismic data that has to be sent is reduced. In one implementation, the telemetry module 216 sends the Z-axis tilt-corrected seismic data in one single telemetry channel, instead of multiple telemetry channels to communicate seismic data for all three axes. The phrase "telemetry channel" refers to a portion of the communications link bandwidth, which can be a time slice, a particular one of multiple frequencies, and so forth.

Figure 5:
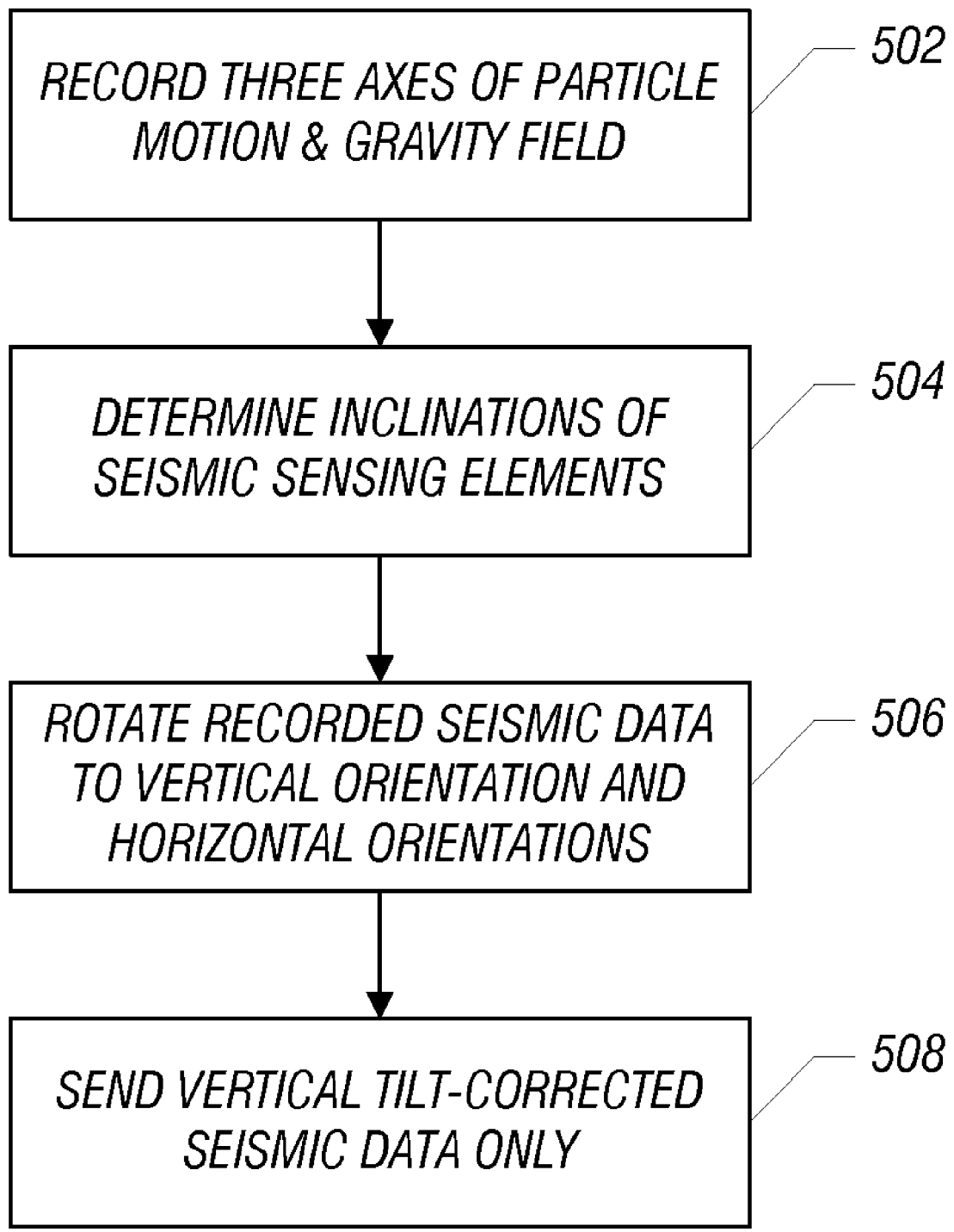
FIG. 5 is a flow diagram of a process of deriving tilt-corrected seismic data in the seismic sensor module of FIG. 4, according to an embodiment.

Referring further to FIG. 5, the seismic sensing elements 304, 306, and 308 (e.g., accelerometers) record (at 502) seismic signals (particle motion signals) in the three respective Z, X, and Y axes. Also, each seismic sensing element 304, 306, and 308 records the component of the gravity field along the respective Z, X, or Y axis. The gravity field component recorded by each seismic sensing element is the DC component. In an alternative implementation, the seismic sensing elements 304, 306, and 308 can be implemented with a three-component (3C) moving coil geophone.

The processor 210 determines (at 504) the inclinations of the seismic sensing elements 304, 306, and 308. The inclination of each respective seismic sensing element is determined by extracting the DC component (expressed in terms of g or gravity) of the recorded signal from the seismic sensing element. The DC component can be extracted by taking an average of the recorded signal over time, or by filtering out the high-frequency components of the recorded signal (using a low-pass filter). The arccosine of the DC component provides the inclination of each axis (Z, X, or Y) with respect to the vertical orientation. Alternatively, if the seismic sensing elements 304, 306, and 308 are implemented with a 3C moving coil geophone, then inclinometers can be used to measure the Inclinations of the elements.

If the seismic sensing elements 304, 306, and 308 are arranged to be exactly orthogonal to each other, then the inclinations of the seismic sensing elements 304, 306, and 308 with respect to the vertical orientation will be the same value. However, due to manufacturing tolerances, the seismic sensing elements 304, 306, and 308 may not be exactly orthogonal to each other, so that the inclinations can be slightly different.

Once the inclinations of the seismic sensing elements 304, 306, and 308 are known, the processor 210 rotates (at 506) the seismic data recorded by the seismic sensing elements 304, 306, and 308 to the vertical orientation and to the two orthogonal horizontal orientations, respectively. Rotating the seismic data involves extrapolating the recorded (tilted) seismic data to the respective vertical or horizontal orientation, as well as removing any noise caused by leakage into a seismic signal along a first orientation (e.g., vertical orientation) of seismic signals in other orientations (e.g., horizontal orientations).

Next, the vertical tilt-corrected seismic data only is sent (at 508) by the seismic sensor module 102. By sending just the vertical tilt-corrected seismic data and not the horizontal seismic data, communications link bandwidth is conserved. In alternative embodiments, instead of sending just the vertical seismic data, horizontal tilt-corrected seismic data can be sent instead. In fact, the seismic sensor module 102 can be selectively programmed or instructed by the recording station 112 (such as in response to a command by a human operator) to send tilt-corrected seismic data along a particular orientation. Also, the operator can select that non-tilt-corrected seismic data along one or more orientations is sent, which may be useful for test, trouble-shooting, or quality control purposes. As yet another alternative, different signal orientations can be sent from different sensor modules, at different spatial spacing. For example, vertical direction can be selected for all sensor modules, and horizontal direction(s) can be selected for only a subset of these sensor modules.

In a different implementation, techniques according to some embodiments can be applied in a seismic data acquisition arrangement that uses just shear-wave seismic sources (e.g., shear-wave acoustic vibrators). As a result, a seismic sensor module will record in just the X and Y horizontal orientations. If the seismic sensor module further includes a compass or magnetometer, then the X and Y seismic signals can be rotated to account for inclinations with respect to any target azimuth (e.g., source-receiver direction or perpendicular to the source-receiver direction, to obtain radial or transverse energy from the shear wave generated by the shear-wave seismic source). After rotation, just the seismic data along one direction has to be sent.

In the same survey, compression-wave seismic sources can also be activated, with the seismic sensor module recording the seismic signal along the vertical orientation. In this case, only the vertical seismic data would be transmitted by the seismic sensor module for recording in the recording station 112 (FIG. 1).

In addition to the tasks depicted in FIG. 5, alternative implementations can also perform seismic sensor module calibration between tasks 502 and 504. Also, filtering can be applied between tasks 502 and 504, and/or between 506 and 508, to filter out noise such as ground roll noise, which is the portion of a seismic source signal produced by a seismic source that travels along the ground rather than travels into the subterranean structure.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A seismic sensor module, comprising:
    sensing elements arranged in a plurality of axes to detect seismic signals in a plurality of respective directions; and
    a processor to:
        receive data from the sensing elements;
        determine inclinations of the axes with respect to a particular orientation;
        use the determined inclinations to combine the data received from the sensing elements to derive tilt-corrected seismic data for the particular orientation, wherein the processor is to combine the data received from the sensing elements by using the determined inclinations to determine a noise leaked into a seismic signal along the particular orientation due to seismic signals propagating in other orientations.

2. The seismic sensor module of claim 1, further comprising a telemetry module to send the tilt-corrected seismic data for the particular orientation in a single telemetry channel without sending seismic data in any other orientations.

3. The seismic sensor module of claim 1, wherein the particular orientation is a vertical orientation, and the other orientations are horizontal orientations.

4. The seismic sensor module of claim 1, wherein the sensing elements are accelerometers.

5. The seismic sensor module of claim 1, wherein the sensing elements are arranged in three orthogonal axes.

6. The seismic sensor module of claim 1, wherein the processor is to extract DC values of the seismic signals detected by the seismic sensing elements to determine the inclinations.

7. The seismic sensor module of claim 1, further comprising a housing, wherein the sensing elements and the processor are contained within the housing.

8. A method comprising:
    recording seismic signals by plural seismic sensing elements arranged along plural axes, wherein the seismic sensing elements are contained in a housing of a seismic sensor module;
    rotating, by a processor contained inside the housing, the recorded seismic signals to account for inclination with respect to a target orientation; and
    sending, by the seismic sensor module, the rotated seismic signal along the target orientation over a communications link without sending any other seismic signal in another orientation over the communications link.

9. The method of claim 8, wherein sending the rotated seismic signal along the target orientation over the communications link comprises sending a tilt-corrected vertical seismic signal over the communications link, without sending any other seismic signal in any other orientation over the communications link.

10. The method of claim 9, further comprising removing noise from the tilt-corrected vertical seismic signal.

11. The method of claim 10, wherein removing the noise from the tilt-corrected vertical seismic signal comprises removing noise caused by leakage of horizontal seismic signals into a seismic signal along a vertical orientation.

12. The method of claim 9, further comprising determining inclinations of the seismic sensing elements with respect to a vertical orientation, wherein the rotating is based on the determined inclinations.

13. The method of claim 12, wherein determining the inclinations of the seismic sensing elements with respect to the vertical orientation comprises extracting DC components of the recorded seismic signals.

14. The method of claim 8, wherein recording the seismic signals by the plural seismic sensing elements comprises recording the seismic signals by plural accelerometers.

15. The method of claim 8, wherein rotating the recorded seismic signals to account for inclination with respect to a target orientation comprises rotating the recorded seismic signals to account for inclination with respect to a target azimuth of the seismic sensor module.

16. A system to perform a subterranean survey, comprising:
    a plurality of seismic sensor modules, wherein at least a particular one of the seismic sensor modules comprises:
        sensing elements arranged in a plurality of axes to detect seismic signals in a plurality of respective directions; and
        a processor to:
            receive data from the sensing elements;
            determine inclinations of the axes with respect to a particular orientation;
            use the determined inclinations to combine the data received from the sensing elements to derive tilt-corrected seismic data for the particular orientation, wherein the processor is to combine the data received from the sensing elements by using the determined inclinations to determine a noise leaked into a seismic signal along the particular orientation due to seismic signals propagating in other orientations.

17. The system of claim 16, wherein the at least one seismic sensor module further comprises a telemetry module to send the tilt-corrected seismic data for the particular orientation in a single telemetry channel without sending seismic data in other orientations.

18. The system of claim 16, wherein the particular orientation comprises a vertical orientation.

19. The system of claim 16, wherein the particular seismic sensor module comprises a housing containing the sensing elements and the processor.

20. The system of claim 19, wherein a second of the plurality of seismic sensor modules comprises a housing containing:
    sensing elements arranged in a plurality of axes to detect seismic signals in a plurality of respective directions; and
    a processor to:
        receive data from the sensing elements of the second seismic sensor module;

determine inclinations of the axes of the sensing elements in the second seismic sensor module with respect to the particular orientation; and use the determined inclinations of the axes of the sensing elements in the second seismic sensor module to combine the data received from the sensing elements of the second seismic sensor module to derive tilt-corrected seismic data for the particular orientation for the second seismic sensor module.

* * * * *